United States Patent
Okamoto et al.

(10) Patent No.: US 12,298,159 B2
(45) Date of Patent: May 13, 2025

(54) TECHNIQUE FOR ANALYZING A SPECTRUM OF BACKSCATTERED LIGHT IN AN OPTICAL FIBER

(71) Applicant: NIPPON TELEGRAPH AND TELEPHONE CORPORATION, Tokyo (JP)

(72) Inventors: Tatsuya Okamoto, Musashino (JP); Daisuke Iida, Musashino (JP); Yusuke Koshikiya, Musashino (JP); Nazuki Honda, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 18/283,498

(22) PCT Filed: Mar. 25, 2021

(86) PCT No.: PCT/JP2021/012729
§ 371 (c)(1),
(2) Date: Sep. 22, 2023

(87) PCT Pub. No.: WO2022/201473
PCT Pub. Date: Sep. 29, 2022

(65) Prior Publication Data
US 2024/0175726 A1    May 30, 2024

(51) Int. Cl.
*G01D 5/353*  (2006.01)
*G01K 11/32*  (2021.01)
*G01L 1/24*   (2006.01)
*G01M 11/00*  (2006.01)

(52) U.S. Cl.
CPC ..... *G01D 5/35358* (2013.01); *G01D 5/35361* (2013.01); *G01K 11/32* (2013.01); *G01L 1/242* (2013.01); *G01M 11/3172* (2013.01)

(58) Field of Classification Search
CPC .......... G01D 5/35358; G01D 5/35361; G01K 11/32; G01L 1/242
See application file for complete search history.

(56) References Cited

U.S. PATENT DOCUMENTS

| | | | |
|---|---|---|---|
| 2011/0058685 A1* | 3/2011 | Sagayama | G10L 21/0272 381/98 |
| 2018/0045542 A1* | 2/2018 | Ramirez-Mancilla | G01D 5/35358 |
| 2019/0285487 A1 | 9/2019 | Seeley | |

OTHER PUBLICATIONS

Mark Froggatt and Jason Moore, "High-spatial-resolution distributed strain measurement in optical fiber with Rayleigh scatter", Applied Optics 37.10 (1998): 1735-1740.
D. P. Zhou, Z. Qin, W. Li, L. Chen, and X. Bao, "Distributed vibration sensing with time-resolved optical frequency-domain reflectometry", Opt. Exp., vol. 20, No. 12, pp. 13138-13145, 2012.
(Continued)

*Primary Examiner* — Jennifer D Bennett
*Assistant Examiner* — Erin R Garber
(74) *Attorney, Agent, or Firm* — Harness, Dickey & Pierce, P.L.C.

(57) ABSTRACT

The present disclosure generates an optical spectrogram, representing a temporal change in frequency characteristics, using a plurality of spectral data measured by an OFDR measurement instrument at different times, and filters the optical spectrogram in both a time direction and a frequency direction.

7 Claims, 10 Drawing Sheets

(56) References Cited

OTHER PUBLICATIONS

Z. Zhang, X. Fan and Z. He, "Long-Range Distributed Static Strain Sensing With < 100 Nano-Strain Resolution Realized Using OFDR", Journal of Lightwave Technology, vol. 37, No. 18, pp. 4590-4596, Sep. 15, 2019.

Okamoto Tatsuya et al.: "Identification of Sagging Aerial Cable Section by Distributed Vibration Sensing Based on OFDR", 2019 Optical Fiber Communications Conference and Exhibition ( OFC), OSA, Mar. 3, 2019 (Mar. 3, 2019), pp. 1-3, XP033540126, [ retrieved on Apr. 22, 2019].

Moritz Niko et al.: "An Auditory Inspired Amplitude Modulation Filter Bank for Robust Feature Extraction in Automatic Speech Recognition", RXIV:1806.04885V2, vol. 23, No. 11,Nov. 1, 2015 (Nov. 1, 2015), pp. 1926-1937, XP011664421, DO1:10.1109/TASLP. 2015.2456420 [ retrieved on Jul. 27, 2015].

* cited by examiner

[4]

[5]

[7]

TECHNIQUE FOR ANALYZING A SPECTRUM OF BACKSCATTERED LIGHT IN AN OPTICAL FIBER

CROSS-REFERENCE TO RELATED APPLICATIONS

This application is a 371 U.S. National Phase of International Application No. PCT/JP2021/012729, filed on Mar. 25, 2021. The entire disclosure of the above application is incorporated herein by reference.

TECHNICAL FIELD

The present disclosure relates to a technique for analyzing a spectrum of backscattered light in an optical fiber.

BACKGROUND ART

By measuring time-series data (spectrogram) of a spectrum of Rayleigh backscattered light in an optical fiber, using optical frequency domain reflectometry (OFDR), and by analyzing a spectral shift, temperature and strain sensing can be performed (Non Patent Literature 1 and 2). However, when there is phase noise in an OFDR laser, the spectrum structures at individual times vary, and the reproducibility deteriorates. Therefore, the phase noise of the laser becomes noise in spectral shift analysis dependent on temperature and strain.

Non Patent Literature 3 proposes a technique of monitoring phase noise of a laser simultaneously with temperature and strain sensing to compensate for the phase noise. However, the technique of Non Patent Literature 3 adds a monitoring reception channel, leading to complication of a reception system and prolongation of analysis time due to signal processing with a large load.

CITATION LIST

Non Patent Literature

Non Patent Literature 1: Mark Froggatt, and Jason Moore. "High-spatial-resolution distributed strain measurement in optical fiber with Rayleigh scatter." Applied Optics 37.10 (1998): 1735-1740.
Non Patent Literature 2: D. P. Zhou, Z. Qin, W. Li, L. Chen, and X. Bao, "Distributed vibration sensing with time-resolved optical frequency-domain reflectometry," Opt. Exp., vol. 20, no. 12, pp. 13138-13145, 2012.
Non Patent Literature 3: Z. Zhang, X. Fan and Z. He, "Long-Range Distributed Static Strain Sensing With <100 Nano-Strain Resolution Realized Using OFDR," Journal of Lightwave Technology, vol. 37, no. 18, pp. 4590-4596, 15 Sep. 15, 2019.

SUMMARY OF INVENTION

Technical Problem

An object of the present disclosure is to reduce measurement instrument noise without complicating a reception system nor prolonging an analysis time.

Solution to Problem

An analysis device of the present disclosure generates an optical spectrogram, representing a temporal change in frequency characteristics, using a plurality of spectral data measured by an OFDR measurement instrument at different times, and filters the optical spectrogram in both a time direction and a frequency direction.

A measurement system of the present disclosure includes an OFDR and the analysis device of the present disclosure.

A measurement method of the present disclosure includes:
acquiring a plurality of spectral data by measuring backscattered light with an OFDR measurement instrument at different times;
generating an optical spectrogram, representing a temporal change in frequency characteristics, using the plurality of spectral data; and
filtering the optical spectrogram in both a time direction and a frequency direction.

A program of the present disclosure is a program for being implemented on a computer as each functional unit included in the analysis device according to the present disclosure, and is a program for getting a computer to execute each step included in the method to be executed by the analysis device according to the present disclosure.

Advantageous Effects of Invention

According to the present disclosure, it is practicable to control a change in a spectrum structure due to a phase noise of a laser without complicating a reception system nor prolonging an analysis time, and to reduce measurement instrument noise.

BRIEF DESCRIPTION OF DRAWINGS

FIG. 8 illustrates an example of a time waveform of strain that is analyzed from an optical spectral shift and that the filter of the present disclosure is applied to.
FIG. 9 illustrates an example of a time waveform of strain that no filter is applied to.

DESCRIPTION OF EMBODIMENTS

Figure 1:
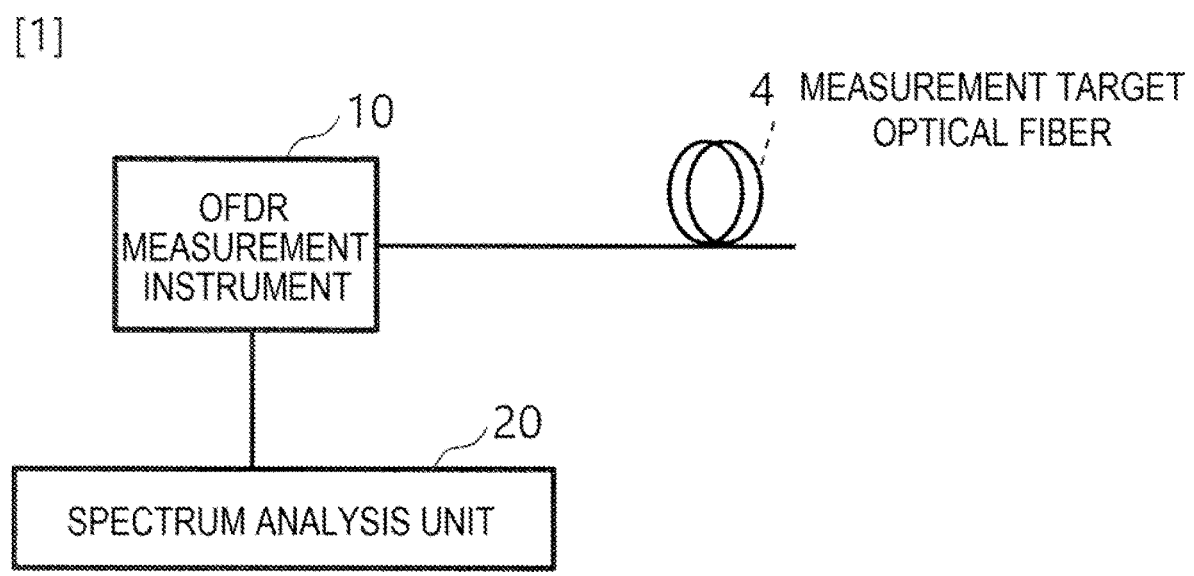
FIG. 1 illustrates an example of a system configuration of the present disclosure.

Hereinafter, an embodiment of the present disclosure will be described in detail with reference to the drawings. Note that the present disclosure is not limited to the embodiment described below. The embodiment is merely an example, and the present disclosure can be carried out in forms with various modifications and improvements on the basis of knowledge of those skilled in the art. Note that components having the same reference numerals in the present specification and the drawings indicate the same components.

FIG. 1 illustrates an example of a system configuration of the present disclosure. A measurement system of the present disclosure includes an OFDR measurement instrument 10 that measures a spectrum of backscattered light reflected or scattered in a measurement target optical fiber 4, and a spectrum analysis unit 20 that acquires and analyzes spectral data obtained by the OFDR measurement instrument 10. The spectrum analysis unit 20 can function as an analysis device of the present disclosure and be also actualized by a computer and a program, and the program can be recorded on a recording medium or be provided through a network.

Figure 2:
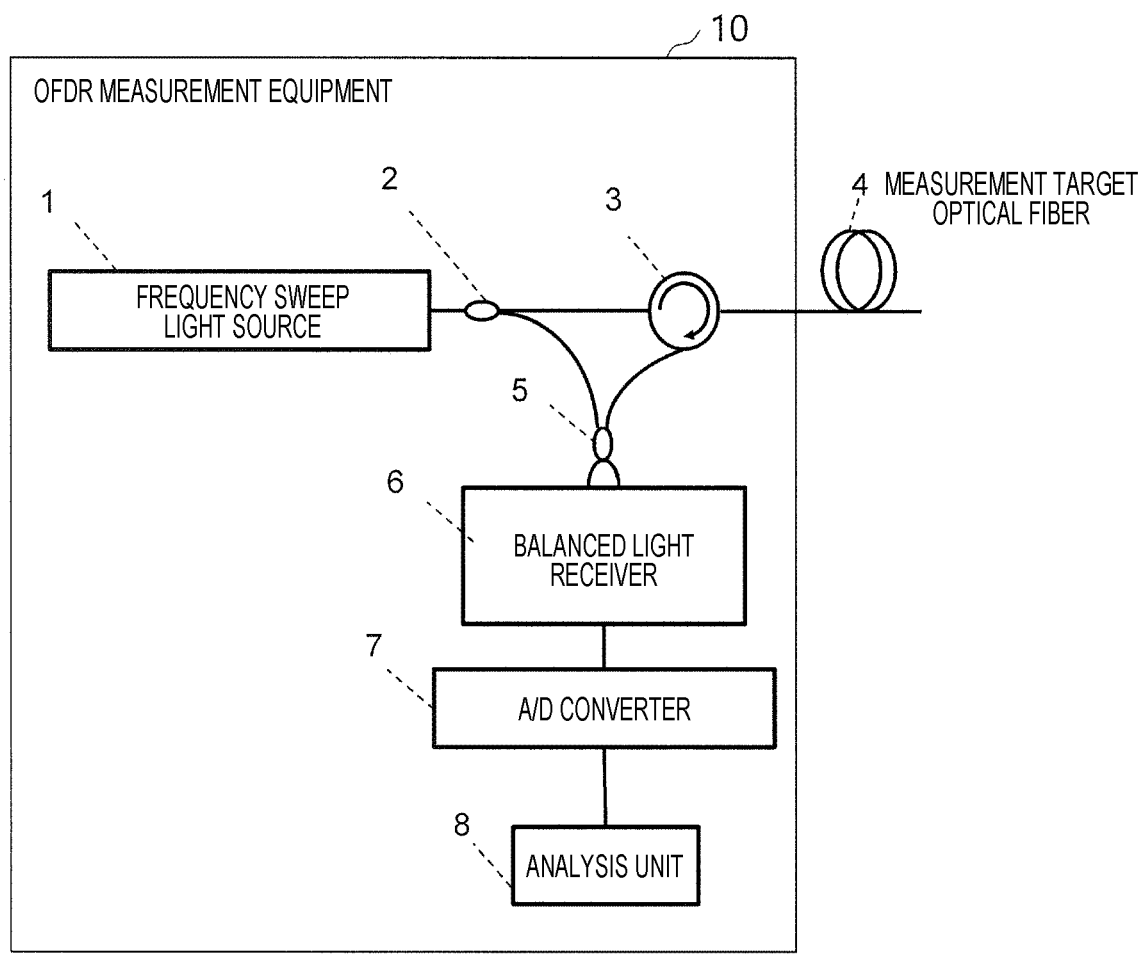
FIG. 2 illustrates a configuration example of an OFDR measurement instrument.

FIG. 2 illustrates a configuration example of the OFDR measurement instrument 10. The OFDR measurement instrument 10 includes a laser 1, which is a frequency sweep light source, a coupler 2, a circulator 3, a coupler 5, a balanced light receiver 6, an A/D converter 7, and an analysis unit 8.

The coupler 2 branches light from the laser 1 into a reference optical path for local light and a measurement optical path for probe light. The probe light branched into the measurement optical path enters the measurement target optical fiber 4 via the coupler 2 and the circulator 3. The coupler 5 multiplexes signal light that is the backscattered light in the measurement target optical fiber 4 and the local light branched by the coupler 2. The balanced light receiver 6 receives the interfered light obtained by multiplexing by the coupler 5. The interfered light has a beat frequency corresponding to the optical path length difference between the reference optical path and the measurement optical path. The A/D converter 7 converts an output signal of the balanced light receiver 6 into a digital signal. The analysis unit 8 uses and analyzes the digital signal from the A/D converter 7, and measures the spectrum of the backscattered light in the measurement target optical fiber 4.

Figure 3:
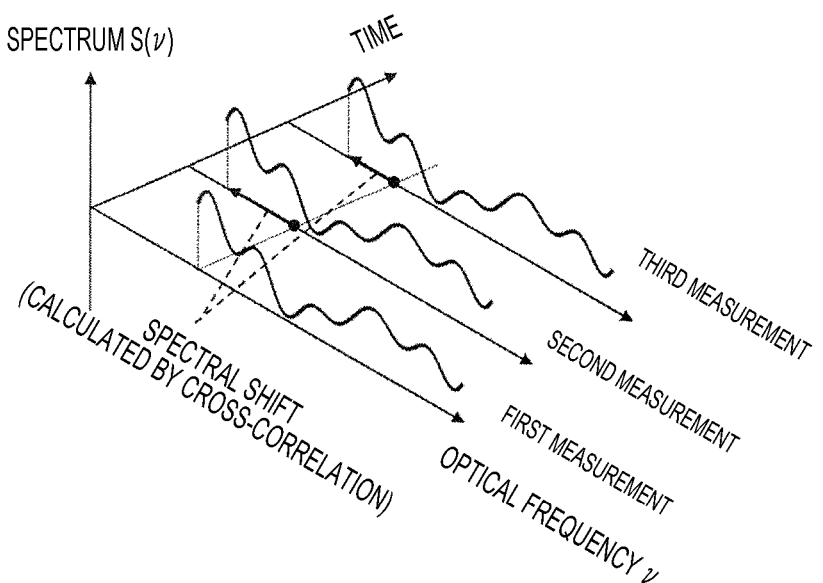
FIG. 3 illustrates an example of a spectrum obtained by the OFDR measurement instrument.
Figure 4:
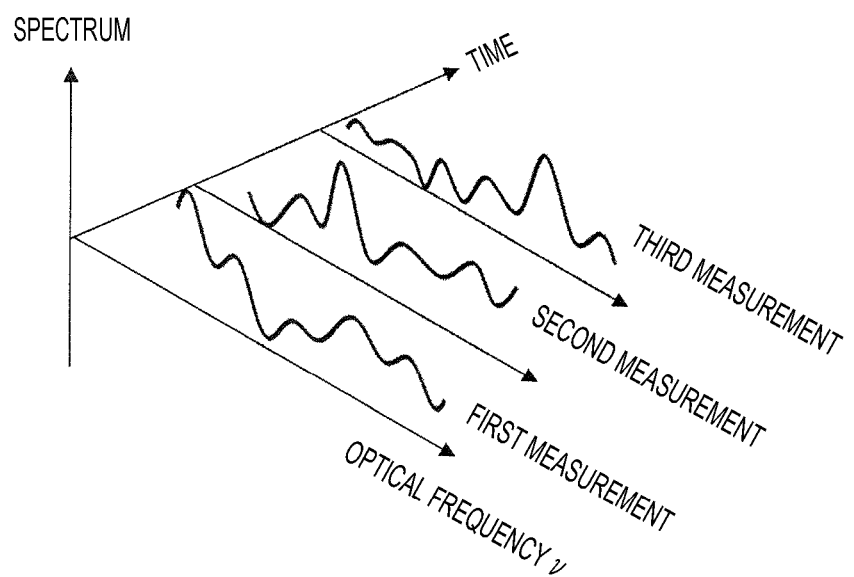
FIG. 4 illustrates an example of a spectrum obtained by the OFDR measurement instrument.

FIGS. 3 and 4 illustrate an example of a spectrum obtained by the OFDR measurement instrument 10. When the phase noise of the laser 1 does not affect the spectrum measurement, as illustrated in FIG. 3, the spectrum structure is the same for each measurement, and the spectrum is shifted, dependently on the temperature and strain amount, with the spectrum structure maintained. On the other hand, when the phase noise of the laser 1 affects the spectrum measurement, as illustrated in FIG. 4, the spectrum structure changes for each measurement, and the spectral shift depending on the temperature and strain amount cannot be calculated.

Figure 5:
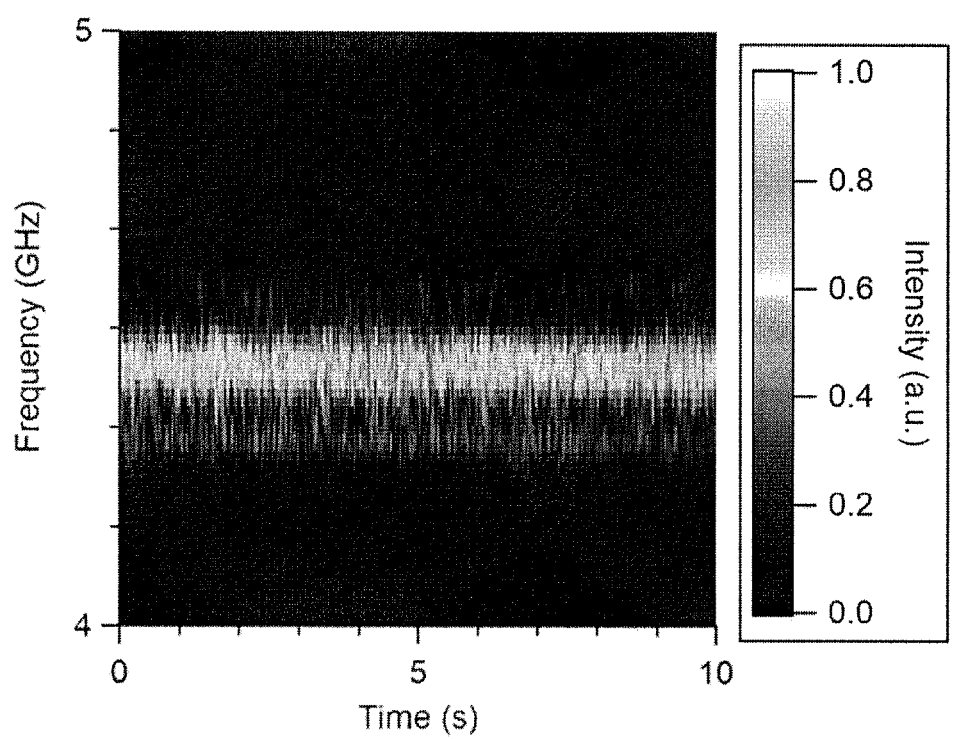
FIG. 5 is an example of an optical spectrogram before filtering.

The spectrum analysis unit 20 of the present disclosure generates an optical spectrogram, representing a temporal change in frequency characteristics, using a plurality of spectral data. FIG. 5 illustrates an example of an optical spectrogram where the filtering of the present disclosure is not performed. In FIG. 5, only a band having a high optical spectral intensity is illustrated.

The spectrum analysis unit 20 of the present disclosure applies a Gaussian filter f(t,n) in both time direction and frequency direction to the generated optical spectrogram, thereby reducing a change in the spectrum structure due to the phase noise of the laser 1.

[Math. 1]

$$f(t, v) = \exp\left\{-4\ln 2\left[\left(\frac{t}{\Delta t}\right)^2 + \left(\frac{v}{\Delta v}\right)^2\right]\right\} \quad (1)$$

Here, t is time, ν is optical frequency, Δt is the width of the Gaussian filter in the time direction, and Δν is the width in the frequency direction.

Figure 6:
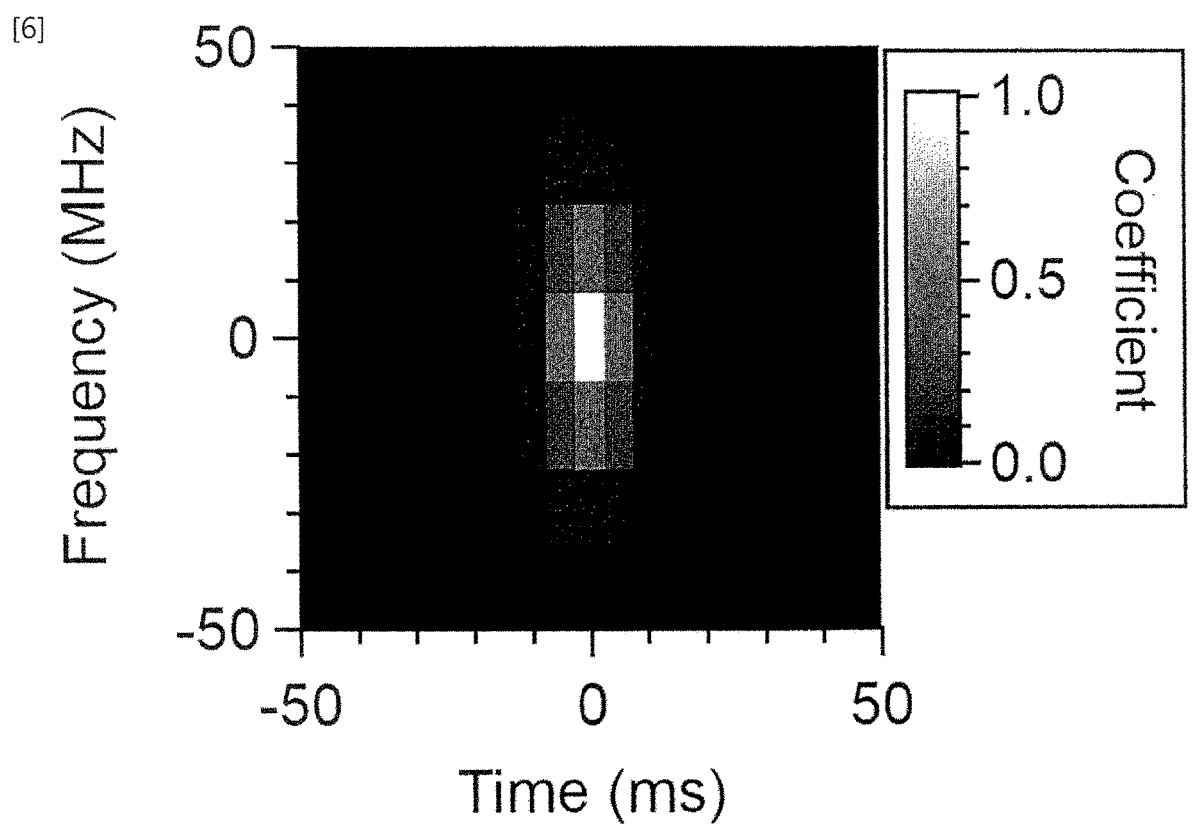
FIG. 6 illustrates an example of a filter profile of a Gaussian filter.

FIG. 6 illustrates an example of a filter profile of a Gaussian filter with Δt=10 ms and Δν=30.3 MHz. The width Δt of the Gaussian filter in the time direction determines cutoff frequency $f_c \sim 1/\Delta t$ of a low-pass filter with respect to the spectral shift. In addition, the original spectrum structure can be maintained by making the width Δν in the frequency direction smaller than the frequency resolution of the measured optical spectrogram. Therefore, the width Δν is set to be smaller than the frequency resolution of the OFDR measurement instrument 10. On the other hand, when the blurring is larger than the frequency resolution, the original spectrum structure may be lost.

The noise of the OFDR measurement instrument 10 can be measured by measuring the measurement target optical fiber 4 in a stationary state. Therefore, an optical spectrogram at one point of the measurement target optical fiber 4 in a stationary state was analyzed to evaluate noise of the OFDR measurement instrument 10. Specifically, a Gaussian filter having the profile illustrated in FIG. 4 was applied to the optical spectrogram analyzed with an optical spectral analysis length of 1.3 m (corresponding frequency resolution of 77 MHz).

Figure 7:
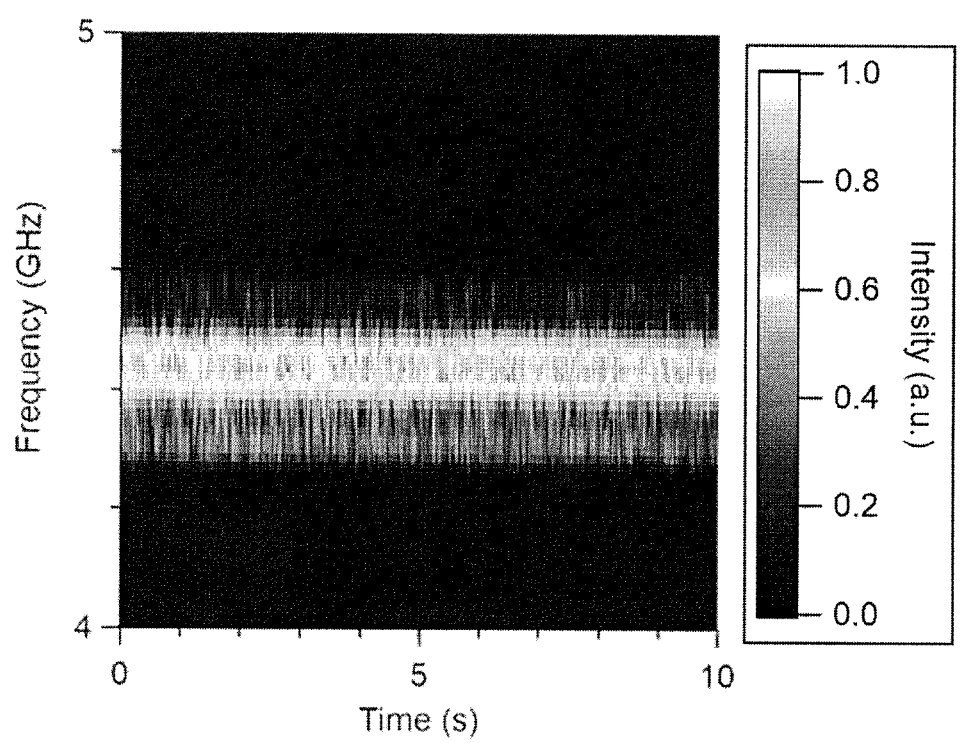
FIG. 7 is an example of an optical spectrogram after filtering.

FIG. 7 illustrates an example of an optical spectrogram of the present disclosure. Also in FIG. 7, only a band having a high optical spectral intensity is illustrated. In the optical spectrogram illustrated in FIG. 7, as compared with the situation without the Gaussian filter as illustrated in FIG. 5, by applying the Gaussian filter, the deterioration of the reproducibility of the spectrum structure due to the phase noise of the laser is controlled, and the same spectrum structure is obtained at each time.

Figure 8:
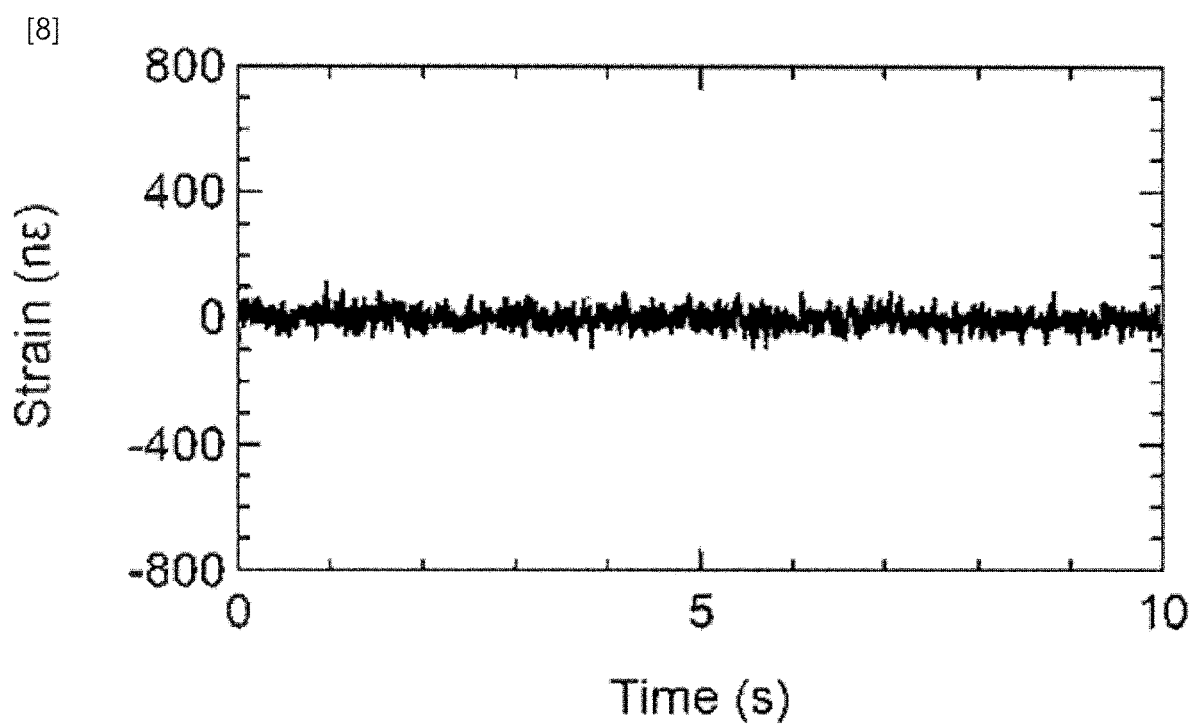
Figure 9:
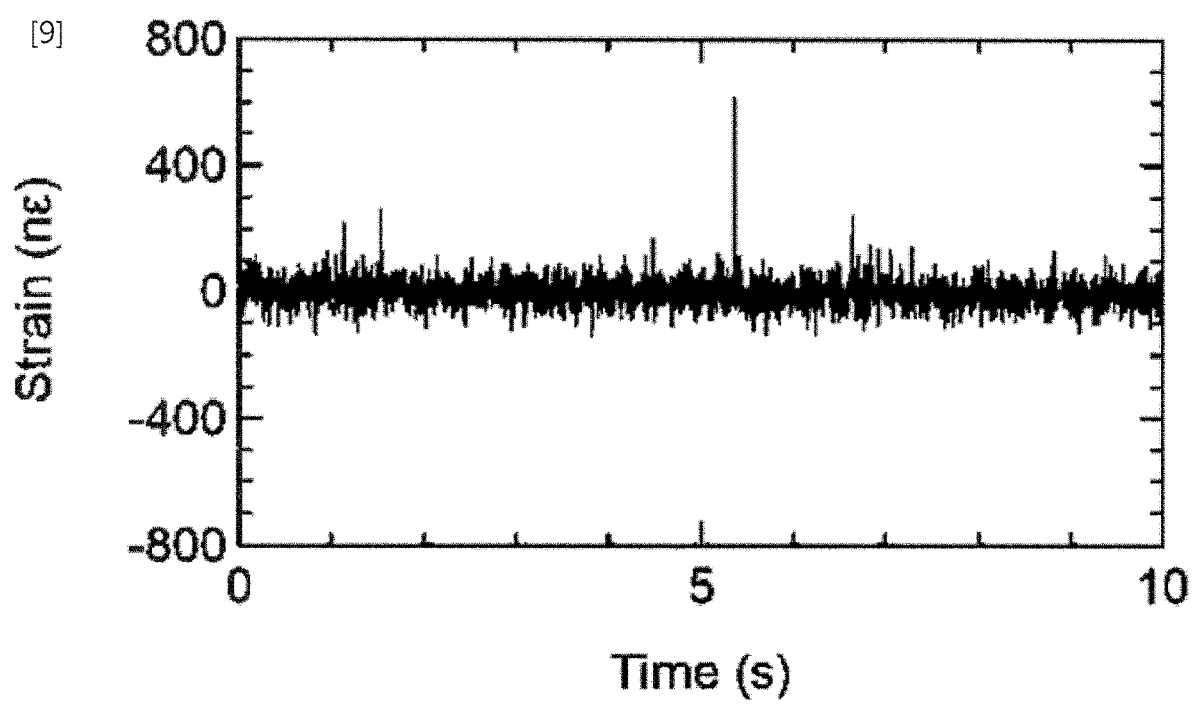
Figure 10:
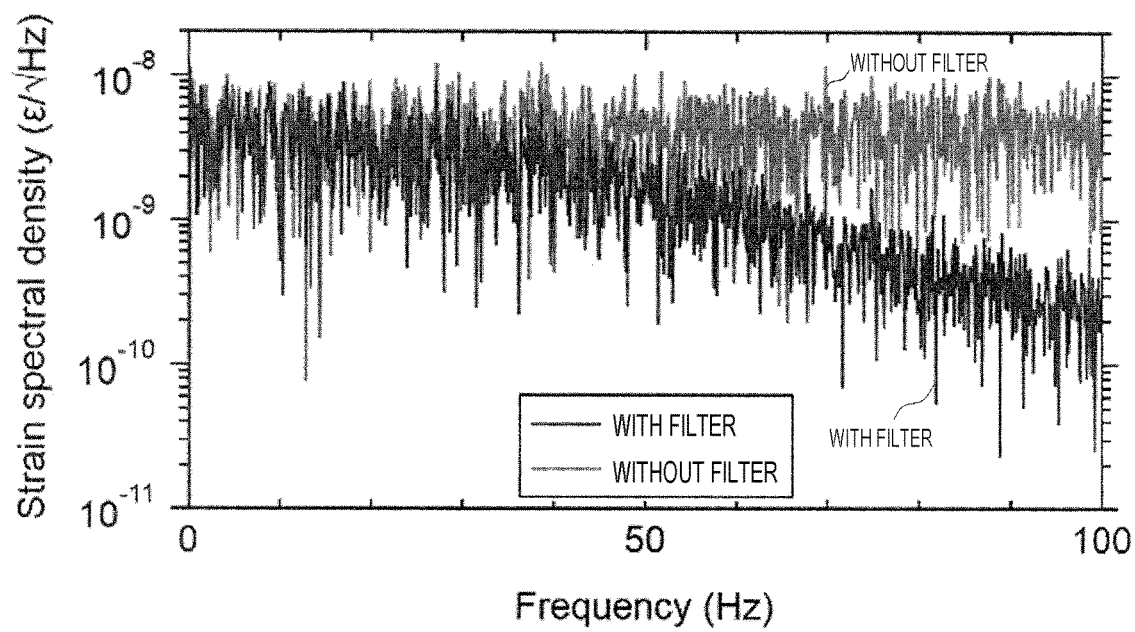
FIG. 10 illustrates an example of a spectral density of strain.

FIGS. 8 to 10 illustrate an example of the effect of filtering with respect to the measured strain. FIGS. 8 and 9 illustrate an example of a time waveform of strain analyzed from an optical spectral shift. FIG. 8 illustrates a situation where the Gaussian filter of the present disclosure is applied. FIG. 9 illustrates a situation where no filter is applied. FIG. 10 is a spectral density of strain. From the spectral density illustrated in FIG. 10, it can be seen that a high-frequency component of 40 Hz or more is reduced by low-pass filtering of the Gaussian filter. As described above, according to the present disclosure, it can be seen that a change in the spectrum structure due to the phase noise of the laser is controlled, and as a result, the measurement instrument noise is reduced. Therefore, the present disclosure can perform temperature and strain sensing in which a change in spectrum structure is controlled by calculating a spectral shift using an optical spectrogram after filtering.

INDUSTRIAL APPLICABILITY

The present disclosure can be applied to information and communication industries.

REFERENCE SIGNS LIST

1 Laser
2 Coupler
3 Circulator
4 Measurement target optical fiber
5 Coupler
6 Balanced light receiver 7 A/D converter
8 Analysis unit
10 OFDR measurement instrument
20 Spectrum analysis unit

The invention claimed is:

1. An analysis device that generates an optical spectrogram, representing a temporal change in frequency characteristics, using a plurality of spectral data measured by an OFDR measurement instrument at different times, and filters the optical spectrogram in both a time direction and a frequency direction, wherein a width $\Delta v$ of filtering in the frequency direction is smaller than a frequency resolution of the OFDR measurement instrument.

2. The analysis device according to claim 1 that calculates a spectral shift using the optical spectrogram after filtering.

3. The analysis device according to claim 1, wherein a width $\Delta t$ of filtering in the time direction is defined by a cutoff frequency with respect to a spectral shift.

4. The analysis device according to claim 1, wherein the filtering is a Gaussian filter.

5. A measurement system comprising:
the OFDR measurement instrument; and
the analysis device according to claim 1 that acquires the plurality of spectral data measured by the OFDR measurement instrument at different times.

6. A computer-readable storage medium storing a program for causing a computer to execute as each functional unit included in the analysis device according to claim 1.

7. A measurement method comprising:
acquiring a plurality of spectral data by measuring backscattered light with an OFDR measurement instrument at different times;
generating an optical spectrogram, representing a temporal change in frequency characteristics, using the plurality of spectral data; and
filtering the optical spectrogram in both a time direction and a frequency direction, wherein a width $\Delta v$ of filtering in the frequency direction is smaller than a frequency resolution of the OFDR measurement instrument.

* * * * *